United States Patent [19]

Auwerda et al.

[11] Patent Number: 4,493,721
[45] Date of Patent: Jan. 15, 1985

[54] METHOD OF MANUFACTURING OPTICAL FIBRES

[75] Inventors: Cornelis P. Auwerda; Gerrit J. Koel, both of Eindhoven, Netherlands

[73] Assignee: U.S. Philips Corporation, New York, N.Y.

[21] Appl. No.: 482,351

[22] Filed: Apr. 5, 1983

[30] Foreign Application Priority Data

Apr. 6, 1982 [NL] Netherlands ............... 8201453

[51] Int. Cl.³ .................................. C03B 20/00
[52] U.S. Cl. ................................ 65/3.12; 65/31
[58] Field of Search .............. 65/3.12, 18.2, 31; 427/38, 39, 163; 156/643, 646, 662, 663

[56] References Cited

U.S. PATENT DOCUMENTS

| | | | |
|---|---|---|---|
| 3,795,557 | 3/1974 | Jacob | 156/8 |
| 4,165,915 | 8/1979 | Rau et al. | 65/3.12 X |
| 4,227,975 | 10/1980 | Hartman et al. | 156/643 X |
| 4,314,833 | 2/1982 | Küppers | 65/3.12 |

FOREIGN PATENT DOCUMENTS

| | | | |
|---|---|---|---|
| 55-10468 | 1/1980 | Japan | 65/3.12 |
| 2067182 | 7/1981 | United Kingdom | |

Primary Examiner—S. Leon Bashore
Assistant Examiner—Michael K. Boyer
Attorney, Agent, or Firm—Marc D. Schechter

[57] ABSTRACT

Optical fibres are manufactured by etching the inner wall of a tube. The tube wall is etched by passing a hydrogen-free fluorine compound through the tube while reciprocating a nonisothermal plasma through the tube. After etching, core glass is chemically deposited on the etched surface. The core glass is deposited from the gaseous phase while using a nonisothermal plasma for initiating the reaction. The inner-coated tube is then collapsed and drawn to form an optical fiber.

6 Claims, 1 Drawing Figure

METHOD OF MANUFACTURING OPTICAL FIBRES

BACKGROUND OF THE INVENTION

The invention relates to a method of manufacturing optical fibers. In the method, the inner wall of a tube is etched with a fluorine compound. Then, a core glass is chemically deposited on the etched surface. The core glass is deposited from the gaseous phase while using a nonisothermal plasma for initiating the reaction.

Core glass is to be understood to mean, in this connection, the glass which is deposited on the inside of the tube. This includes such layers deposited from the gaseous phase which may be indicated as matching layers and which as such do not belong optically to the core of the fiber. The core of a fiber is to be understood to mean that part of the optical fiber in which the refractive index increases by a step (stepped index) or gradually (gradient index) with respect to a part of the fiber surrounding the core.

The tube used in the method may consist of glass, including doped or undoped fused silica.

A chemical deposition process utilizing a nonisothermal plasma is to be understood to mean herein a process in which a cold plasma is reciprocated in a tube while oxygen and silicon tetrachloride are passed through the tube. A dopant which increases or decreases the refractive index of the deposited glass may be added to the gas mixture. The gas pressure in the tube is less than $1.5 \times 10^4$ Pa (150 mbar), and is preferably between $10^2$ and $3 \times 10^3$ Pa (1 and 30 mbar). During the deposition the glass tube is heated to a temperature between 1000° and 1200° C. At this temperature a thermal reaction, which might lead to the formation of glass soot in the gaseous phase, does not occur at the pressures used. Moreover, the incorporation of chlorine in the deposited glass layers is avoided by this heating. During the steps of collapsing the inner-coated tube into a preform and drawing fibers from the preform formed during collapsing, incorporated chlorine may give rise to gas bubbles. The heating during the deposition also prevents the formation of cracks in the deposited layers in the collapsing step.

In the manufacture of optical glass fibers, it is usual to thoroughly clean the inside of the glass tube or doped or undoped fused silica tube serving as a substrate. A known cleaning method comprises rinsing with a hydrofluoric acid solution in which a small thickness of the tube is etched away. After the etching treatment, prolonged rinsing with water and drying is carried out.

SUMMARY OF THE INVENTION

It is an object of the invention to provide an cleaning-/etching method in which the cumbersome rinsing and drying can be avoided.

In the manufacture of optical fibers while using a heating source reciprocating along the tube for initiating the reaction it has already been suggested to form hydrofluoric acid in the tube. The hydrofluoric acid is formed, while using the heating source, from one or more hydrocarbon compounds which comprise fluorine and hydrogen (See, United Kingdom patent application No. 2,067,182, corresponding to German patent specification No. 3,000,954). Gaseous hydrogen fluoride (HF) is a strong etchant and hence special measures have to be taken to prevent free hydrogen fluoride from reaching the atmosphere.

When a nonisothermal plasma process is used for depositing the core glass, the method of United Kingdom patent application No. 2,067,182 cannot be used. This is because the tube in United Kingdom patent application No. 2,067,182 is heated throughout its length to a temperature at which free HF is formed from the gases suggested therein. In the nonisothermal plasma deposition process, a low pressure is maintained by means of a vacuum pump. Any HF reaching the pump could be particularly harmful to the good operation thereof.

Therefore, according to the invention the inner wall of the tube is etched by passing a hydrogen-free fluorine compound through the tube while a nonisothermal plasma is reciprocated through the tube.

Examples of compounds suitable for this purpose are: $F_2$, $OF_2$, and gaseous and liquid hydrogen-free fluorine compounds to be vaporized, for example $CF_4$ and $C_2F_6$. Hydrogen-free fluorocarbon compounds are preferably used while mixed with oxygen so as to prevent the formation of free carbon and so as to prevent polymerization. Preferably the amount of oxygen in the mixture should at least be sufficient to convert all the carbon present in the fluorine carbon compounds into carbon dioxide.

It has been found that under the influence of a nonisothermal plasma, the hydrogen-free fluorocarbon compound etches the tube wall. $SiF_4$ is formed as a by-product of the etching. Possibly volatile fluorine compounds of impurities present in or on the wall of the glass tube are also formed from the etching.

DESCRIPTION OF THE PREFERRED EMBODIMENTS

Figure 1:
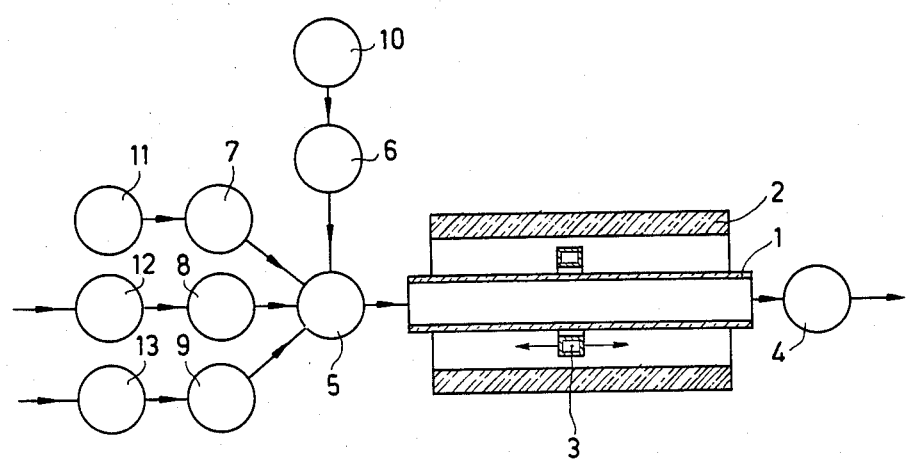
FIG. 1 schematically shows a device for cleaning and internally coating a tube which can be collapsed to form a solid optical fiber preform.

FIG. 1 schematically shows a device for internally coating a tube 1. Tube 1 may be, for example, quartz glass (fused silica) having an inside diameter of 6 mm. The device coats the inside of tube 1 with layers of glass.

The tube 1 is present in a furnace 2. During deposition of the glass layers, the temperature in the furnace 2 is held at 1150° C. The glass layers are provided by flowing a mixture of oxygen and $SiCl_4$ and the required dopant-former through the tube 1, and by reciprocating a resonant cavity 3 along the tube 1 to generate a plasma in the tube 1. A pressure of $2.5 \times 10^3$ Pa (25 mbar) is maintained within tube 1 by means of a vacuum pump 4.

Before the actual deposition process is started, hexafluoroethane ($C_2F_6$) is led into tube 1 from a reservoir 10 via a control device 6. Oxygen is led into tube 1 from a reservoir 11 via a control device 7 and a gas mixing device 5. The ratio of $C_2F_6:O_2$ is preferably at most 1:2, so that any generated carbon can be converted into $CO_2$.

The resonant cavity 3 is reciprocated along the tube at a rate of 3 meters/minute while an electric field of a frequency of 2.45 GHz and an energy of 200 watts is coupled into the tube. The pressure in the tube is maintained at $2.5 \times 10^3$ Pa (25 mbar), although in this stage the pressure may be higher so long as the nonisothermal character of the plasma is not made isothermal. This is usually the case at a pressure exceeding $1.5 \times 10^4$ Pa (150 mbar). The danger would then exist that powdered $SiO_2$ would be formed in the gaseous phase by the reaction of $SiF_4$ and $O_2$.

Under the influence of the plasma, fluorine atoms are formed from the $C_2F_6$. These fluorine atoms etch the tube wall at the area of the plasma by forming $SiF_4$. The formed $SiF_4$, together with oxygen, possibly nonconverted $C_2F_6$, $CO_2$, and possibly other gaseous reaction products are removed via the vacuum pump 4.

The etching step is preferably carried out while heating the furnace 2 to its operating temperature. This may take, for example, fifteen minutes. After the desired temperature has been reached, the flow of the fluorine compound is discontinued, and the deposition of the glass layers in the usual manner is started.

To deposit the glass layers, oxygen is led through a reservoir 12 containing $SiCl_4$.

Here the oxygen picks up $SiCl_4$ vapor, and it is led via a control device 8 to the gas mixing device 5. In device 5, the $SiCl_4$-containing oxygen mixing with oxygen and/or a dopant which is supplied form a reservoir 13 via a control device 9. This is described, for example, in European patent application No. 0 023 066 and in U.S. Pat. No. 4,314,833, the contents of which may be deemed to be incorporated herein by reference in so far as necessary.

After providing a sufficient number of glass layers on the inside of tube 1, the tube is collapsed to form a solid preform in the usual manner. The solid preform is then drawn to form an optical fiber.

The advantage of the method according to the invention is that etching takes place in the absence of hydrogen. Consequently hydrogen will not be incorporated in any manner in the material of the tube wall, for example in the form of hydroxyl (—OH) groups.

Another advantage of the method according to the invention is that any mixture of suitable gases may be used.

Still another advantage of the method according to the invention is that etching can be started at ambient temperature. Etching may also be continued until the tube has been heated throughout its length to the temperature desired for the deposition of the core glass material. As a result, a considerable shortening of the manufacturing time is obtained, since the separate steps used in etching the tube, namely rinsing with hydrofluoric acid solution, rinsing with water and drying, are omitted.

In the method according to the invention the interior of the tube is etched and polished very effectively. This results in a high quality optical fiber.

What is claimed is:

1. A method of manufacturing an optical fiber comprising the steps of:
   providing a glass tube having an inner wall;
   etching the inner wall of the tube with a fluorine compound; and then
   depositing core glass on the etched inner wall of the tube to form a coating, said core glass being formed by reacting gaseous glass-forming compounds in a nonisothermal plasma;
   collapsing the coated tube to form a solid rod; and
   drawing the solid rod into a fiber;
   characterized in that the step of etching consist essentially of the steps of:
   passing a gaseous hydrogen-free fluorine compound through the tube;
   forming a nonisothermal plasma in the tube while passing the fluorine compound through the tube; and
   reciprocating the plasma along the length of the tube.

2. A method of manufacturing an optical fiber as claimed in claim 1, characterized in that the fluorine compound is a hydrogen-free fluorocarbon.

3. A method of manufacturing an optical fiber as claimed in claim 2, characterized in that the fluorocarbon is hexafluoroethane.

4. A method of manufacturing an optical fiber as claimed in claim 1, characterized in that the step of etching further includes passing oxygen through the tube in combination with the hydrogen-free fluorine compound.

5. A method of manufacturing an optical fiber as claimed in claim 4, characterized in that the fluorine compound is a hydrogen-free fluorocarbon.

6. A method of manufacturing an optical fiber as claimed in claim 5, characterized in that the fluorocarbon is hexafluoroethane.

* * * * *